United States Patent Office 3,361,362
Patented Jan. 2, 1968

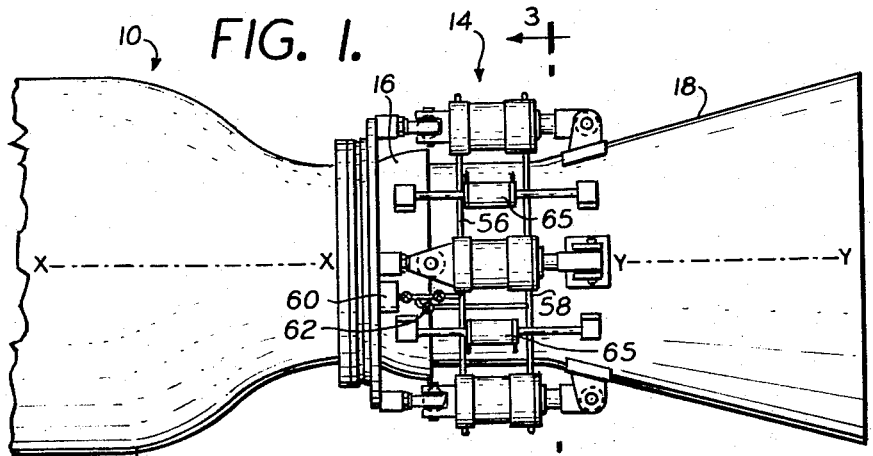
FIG. 1.
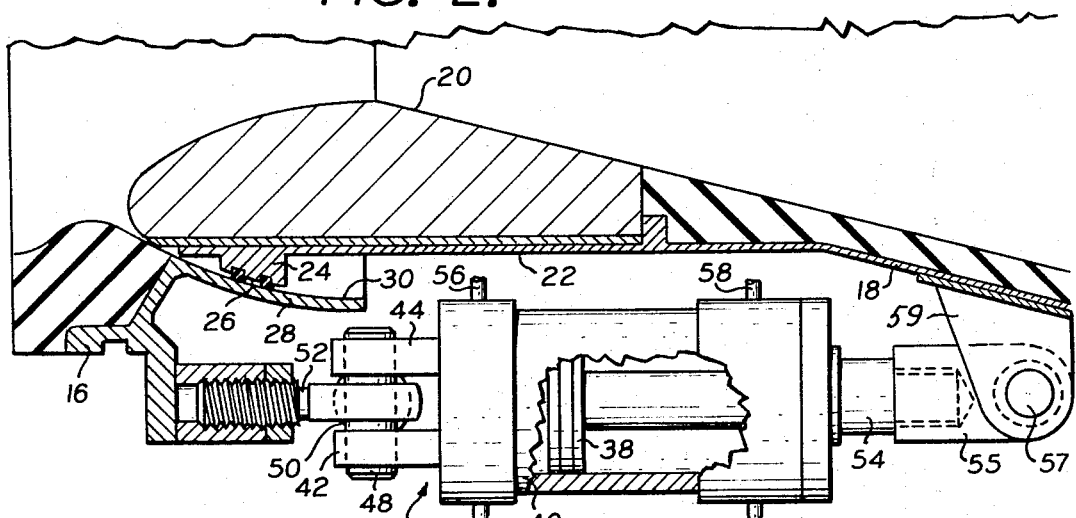
FIG. 2.
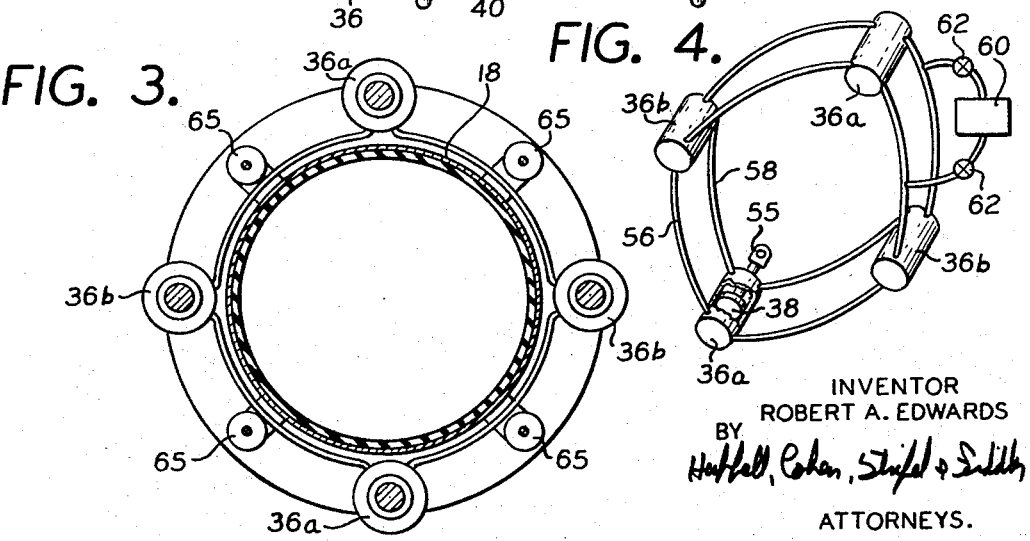
FIG. 3.
FIG. 4.
INVENTOR
ROBERT A. EDWARDS
BY
ATTORNEYS.

3,361,362
MOUNTING COMPRISED OF INTERCONNECTED PISTON AND CYLINDER ASSEMBLIES
Robert A. Edwards, Wycoff, N.J., assignor to Arde-Portland, Inc., South Portland, Maine, a corporation of Maine
Filed Sept. 2, 1965, Ser. No. 484,537
6 Claims. (Cl. 239—265.35)

ABSTRACT OF THE DISCLOSURE

A mounting for supporting a rocket exit cone on a rocket casing for universal pivotal movement of the exit cone relative to the casing about a substantially fixed pivot point, formed by a plurality of uniformly distributed liquid actuatable piston and cylinder assemblies pivotally connected to both the rocket casing and to the exit cone, the head ends of the cylinders all being connected together by a manifold and the piston rod ends of the cylinders all being connected together by a second manifold.

This invention relates to the art of rocket cone mountings, more particularly to an improved mounting for the movable exit cone of a rocket nozzle to provide desired yaw and pitch movement of the nozzle without requiring the use of the conventionally employed gimbal ring.

In the rocketry arts, it is known to mount the exit cone of the rocket nozzle for omni-directional movement relative to the inlet, or stationary component of the nozzle, and then to move the exit cone relative to this stationary component and the rocket casing in accordance with signals relating to the direction of movement of the rocket so as to control the path of rocket movement. In order to obtain desired cone movement, the exit cone is mounted for movement about two axes at right angles to each other, thus effecting control of the pitch and yaw of the rocket. In order to obtain movement of the exit cone in these pitch and yaw planes, a universal joint has in the past been provided by utilizing a gimbal ring such as shown in applicant's assignee's copending application Ser. No. 363,927 and now abandoned. In addition to the problems of effecting desired seals to prevent gas losses at the split line between the movable exit cone and the stationary inlet, the gimbal ring assembly adds undesired weight to the rocket structure. Further problems arise in the mounting of the exit cone for omni-directional movement in that the use of gimbal rings or the like universal joints produces an undesired increase in the envelope of the rocket.

It is with the above problems and desiderata in mind, that the present improved movable exit cone mounting has been provided serving to permit omni-directional movement of the exit cone without requiring mounting of the cone on a gimbal ring or the like weight and envelope increasing structure, and at the same time permitting effecting of desired seals between the movable cone segment and the stationary rocket components.

It is accordingly among the primary objects of this invention to provide improved means for mounting a movable nozzle cone for omni-directional movement with respect to a relatively stationary rocket component.

Another object of the invention is to provide a mounting for a movable rocket nozzle component which adds minimally to the weight or envelope of the rocket.

A further object of the invention is to provide a mounting for a movable nozzle cone of a rocket which will permit the maintenance of a desired relatively gas tight seal between the movable nozzle segment and a relatively stationary portion of the rocket.

These and other objects of the invention which will become hereafter apparent are achieved by providing a jet nozzle for a reaction motor or rocket with the jet nozzle having a movable component such as the exit cone pivotally connected to a stationary gas inlet portion. Between the movable exit cone, and the stationary gas inlet portion, a mating bearing and journal are provided. The journal is preferably formed as an annular ring at the entry end of the exit cone, and the bearing is formed as an annular collar on the leaving end of the relatively fixed gas inlet portion surrounding the journal. The bearing and journal surfaces on the bearing and journal respectively are contoured as segments of a sphere, the center of which is coincident with the desired center of rotation of the nozzle exit cone. As will be understood by those skilled in the art, this center of rotation of the nozzle exit cone lies on a longitudinal axis through the stationary and movable parts of the jet nozzle. In order to insure maintenance of the movable nozzle portion in desired juxtaposition with respect to the gas inlet portion during movement of the movable nozzle portion, a first extensible member is positioned between the stationary nozzle portion or gas inlet and the movable nozzle portion or exit cone. The extensible members are pivotally connected to said nozzle portions. It is preferred that these pivot connections be a universal pivot joint, and that two such extensible members be arranged at diametrically opposed sides of the movable nozzle. A second extensible member or pair of members is arranged between the stationary gas inlet portion and the movable nozzle portion and pivotally connected thereto, said second extensible means lying in a plane at 90 degrees to a plane extending through said first extensible means and the center of rotation of the movable nozzle. Interconnecting means are provided between said extensible members so that extension of one of said extensible members will result in a contraction of the other thereby insuring maintenance of the center of rotation of the movable cone in a relatively fixed position with respect to the rocket engine. In the hereafter described illustrated preferred embodiment of the invention, these extensible members are shown to comprise piston-cylinder assemblies with a fluid interconnecting line between the piston-cylinder assemblies.

Among the important features of the invention is the utilization of these extensible members to provide a desired pivotal support for the movable exit cone without necessitating the use of a gimbal ring, thereby permitting a reduction in the weight of the rocket engine.

Another feature of the invention resides in the fact that the use of the extensible members in forming the omni-directional mounting serves to reduce the envelope dimensions of the rocket engine.

The specific details of a preferred embodiment of the invention, and their desired mode of functioning, will be made most manifest and particularly pointed out in clear, concise and exact terms in conjunction with the accompanying drawings, wherein:

FIG. 1 is a schematic elevational view of the nozzle end of a rocket engine made in accordance with the teachings of this invention; and FIG. 2 is an enlarged cross-sectional view through the fixed and movable portions of the nozzle illustrating the details of interconnection between these fixed and movable portions; and FIG. 3 is a cross-sectional view taken on line 3—3 of FIG. 1, FIG. 4 is a schematic view of the fluid system.

Referring now more particularly to the drawings, like numerals in the various figures will be employed to designate like parts.

As seen in FIG. 1, the rear end of a rocket engine 10 is illustratively shown as including a rocket casing 12 provided with a nozzle assembly generally designated by the numeral 14.

Nozzle assembly 14, as seen to the right in FIG. 1, and as shown in detail in FIG. 2, comprises a relatively fixed gas inlet portion 16, and a movable exit cone 18. Exit cone 18 is of a conventional outwardly flaring configuration with a throat portion 20. Inlet end 22 of exit cone 18, as best seen to the left in FIG. 2, is provided with a journal 24 in the form of an annular ring. Journal 24 is provided with a journal surface 26 contoured as the segment of a spherical surface having a center of rotation coincident with the desired center of rotation of the movable exit cone 18, which as will be understood by those skilled in the art lies on the longitudinal axis Y—Y through movable exit cone 18 and X—X through stationary inlet portion 16. This point of rotation lies at the intersection of axes X—X and Y—Y when movable exit cone 18 is displaced from the horizontal orientation illustrated in FIG. 1.

The relatively stationary gas inlet portion 16 is formed with a annular bearing 28 surrounding journal 24 of movable nozzle cone 18. Bearing 28 is formed with a bearing surface 30 mating with journal surface 26 and arcuately contoured as a segment of a sphere the center of which is coincident with the desired center of rotation of movable exit cone 18. A gas-tight seal is insured between the journal 24 and bearing 28 by the utilization of high temperature O-rings, preferably arranged as illustrated in grooves in journal surface 26 and serving to provide a gas-tight seal between the journal surface 26 and bearing surface 30.

Extensible means designated generally by the numeral 36 in FIG. 2 are arranged between movable nozzle exit cone 18 and the stationary gas inlet portion 16. The extensible means are illustratively shown as comprising a double acting piston-cylinder assembly in which a piston 38 is mounted for reciprocation in cylinder 40. Cylinder 40 is provided with trunnions 42 and 44 between which pivot pin 48 is extended. Cross member 50 is pivotally joined to pivot pin 48, and threaded stud 52 is connected to the cross pin so that a universal joint is formed between the stationary gas inlet portion 16 and the cylinder 40. Piston rod 54 is engaged with pivot leg 55 pivoted on pivot pin 57 which is secured between lugs 59 fastened to movable nozzle cone 18, as seen to the right in FIG. 2.

In the illustrated preferred embodiment, two pairs of extensible elements are arranged at equal spaced distances about the periphery of the movable exit cone 18, as best seen in FIG. 3. A pair designated as 36a, as seen in FIG. 3, is arranged on diametrically opposed sides of the cone 18, and a second pair of extensible elements in the form of piston-cylinder assemblies 36b are arranged on diametrically opposed sides of the cone, with extensible elements 36b lying in a plane at 90 degrees to the plane extending through the axes of extensible elements 36a and the center of rotation of movable exit cone 18.

Each of the piston cylinder assemblies 36 is of a double acting type, as best seen in FIG. 2, with fluid subject to being admitted to the cylinder to exert pressure on both sides of the piston 38. The head ends of piston cylinder assemblies 36a and 36b are interconnected by a fluid conduit 56, and the piston rod ends of the cylinders 40 of each piston cylinder assembly are interconnected by a conduit 58 so that the displacement of fluid from the head end of one of the piston cylinder assemblies of a given pair 36a or 36b will result in this displaced fluid being directed to the opposing cylinder of the pair. In the illustrated preferred embodiment, make-up tank 60 is connected to the fluid conduits between the respective cylinders 40 via position sensitive valves 62 so as to insure the desired maintenance of fluid content in each of the fluid systems between the head ends and between the piston rod ends of each cylinder 40.

Actuating cylinders 65 are shown in the illustrated preferred embodiment to effect desired movement of the exit cone 18. As will be understood by those skilled in the art actuating cylinders 65 are of a conventional type employed in the rocketry arts and are actuated in response to the control systems for effecting desired movement of the exit cone. These are shown as of the conventional hydraulic type, but it will be recognized that a variety of different actuating elements may be employed within the scope of the invention.

*Operation*

The aforedescribed nozzle arrangement for a reaction motor or rocket serves to permit omni-directional movement of a nozzle component such as an exit cone while maintaining a desired gas-tight seal between the movable nozzle component and the stationary nozzle components without requiring the use of relatively heavy gimbal ring structures, and without materially increasing the weight or envelope of the rocket.

In use, the inlet end 22 of the movable exit cone 18 is maintained in the desired operative position with respect to the relatively stationary gas inlet portion 16 so that the journal 24 rides in bearing 28, a gas-tight seal being effected between bearing 28 and journal 24 by means of the O-rings as best seen in FIG. 2. The dimensioning of the piston-cylinder assemblies 36 is such that when the axis Y—Y of movable exit cone 18 lies along the line of axis X—X of the stationary nozzle inlet 16, the piston 38 will lie at a point in cylinder 40 such that there is equal fluid on both sides of the piston, and journal 24 is seated on bearing 28. As will be understood by those skilled in the art, the clearance between the faces of piston 38 and the ends of cylinder 40 are such as to permit sufficient movement of piston 38 within the cylinder 40 such as to accommodate the desired degree of movement of the exit cone 18.

When the exit cone 18 is moved downwardly, piston 38 as seen in FIG. 2 moves to the left, displacing the fluid contained in the head end of cylinder 40. This displaced fluid is directed through head end connecting fluid conduit 56 to the upper piston-cylinder assembly 36a as viewed in FIG. 3, thus causing the piston within piston-cylinder assembly 36a to move to the right as viewed in FIG. 1. Since the quantity of fluid between the head ends of each cylinder pair is substantially complementary, when a lower piston moves a given distance to the left, as viewed in the drawings, the upper piston will move the identical distance to the right. As a result of this complementary movement of the pistons, the exit cone 18 is maintained with its journal 24 in seating relationship with respect to bearing 28, thus insuring the maintenance of a desired seal.

Similarly when the exit cone 18 is moved in the horizontal plane, the fluid displaced from one of the pairs of piston-cylinder assemblies 36b will be directed to the other cylinder of the pair.

Where the movement of the cone 18 is in a plane lying between the planes in which the piston-cylinder assemblies lie, fluid will be displaced from each of the piston-cylinde rassemblies, however, displacement of fluid from any one cylinder will be accommodated by a complementary receipt of fluid in an opposing piston-cylinder assembly, thus maintaining the exit cone against displacement from its bearing.

It will be understood by those skilled in the art that the nozzle mounting here disclosed may be used either for submerged or unsubmerged rocket nozzles.

While a preferred form of the present invention has been here disclosed, various changes and modifications may be made therein within the scope of the appended claims without departing from the spirit or scope of this invention.

What is claimed is:

1. A mounting for supporting the exit cone of a rocket on a rocket casing for universal pivotal movement of said exit cone about a substantially fixed pivot point, comprising a plurality of liquid actuatable piston-cylinder assemblies uniformly distributed about the circumference of said exit cone, each of the cylinders of said piston-cylinder assemblies having a head end and a piston rod end, one end of each of said piston-cylinder assemblies being pivotally connected to said rocket casing and the other end thereof being pivotally connected to said exit cone, a first conduit connecting the ends of the cylinders of all of said piston-cylinder assemblies connected to said rocket casing, a second conduit connecting the opposite ends of the cylinders of all of said piston-cylinder assemblies.

2. The mounting of claim 1, further comprising means for pivoting said nozzle along two mutually perpendicular axes.

3. The mounting of claim 1, wherein a mating bearing and journal are provided between said rocket casing and exit cone, said bearing and journal including mating surfaces contoured as portions of a sphere the center of which is substantially coincident with said substantially fixed pivot point.

4. The mounting of claim 1, wherein said plurality of piston-cylinder assemblies comprise four in number and are angularly spaced at ninety degree intervals.

5. A mounting for movably supporting an exit cone of a rocket for omni-directional movement about a fixed pivot point relative to the rocket, said mounting comprising: an annular bearing concentric with an axial line extending through said pivot point; an annular journal within said bearing, said journal concentric with an axis extending through said pivot point; mating segments of spherical surfaces on said bearing and said journal; a seal interposed between said mating spherical surfaces; a first pair of fluid actuated piston-cylinder assemblies between a relatively fixed point of the rocket and the movable exit cone; and a second pair of fluid actuated piston-cylinder assemblies lying in a plane at 90 degrees to a plane extending through said first pair of piston-cylinder assemblies and said pivot point, said second pair of piston-cylinder assemblies being secured between the rocket and the movable exit cone; and a conduit interconnecting said piston-cylinder assemblies to permit the fluid displaced from one of said piston-cylinder assemblies to be directed to another of said piston-cylinder assemblies.

6. A mounting as in claim 5 in which said piston-cylinder assemblies are double acting; and a conduit is arranged to interconnect the head ends and piston ends of each pair of piston-cylinder assemblies.

References Cited

UNITED STATES PATENTS

| | | | |
|---|---|---|---|
| 1,642,752 | 9/1927 | Landon | 239—265.35 |
| 2,510,561 | 6/1950 | De Laval | 60—232 X |
| 2,734,698 | 2/1956 | Straayer | 60—232 X |
| 3,140,584 | 7/1964 | Ritchey et al. | 239—265.35 X |
| 3,275,243 | 9/1966 | Gaubatz | 239—265.35 |

FOREIGN PATENTS

| | | |
|---|---|---|
| 567,048 | 12/1958 | Canada. |
| 844,508 | 8/1960 | Great Britain. |
| 938,270 | 9/1963 | Great Britain. |

M. HENSON WOOD, JR., *Primary Examiner.*

VAN C. WILKS, *Assistant Examiner.*